April 16, 1929.　　　C. R. ALLEN　　　1,709,650
HEAT DEFLECTOR
Filed Jan. 7, 1928
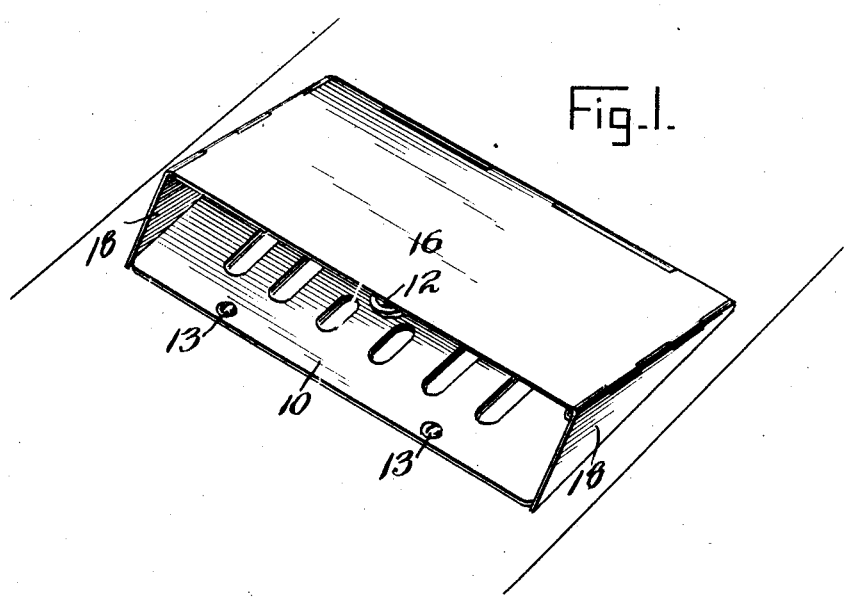
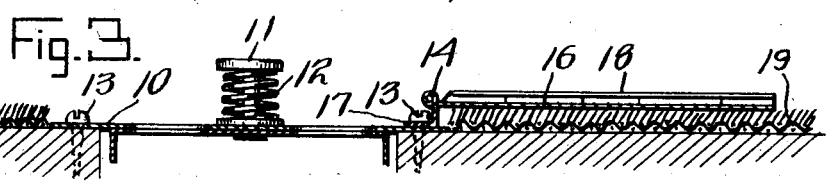
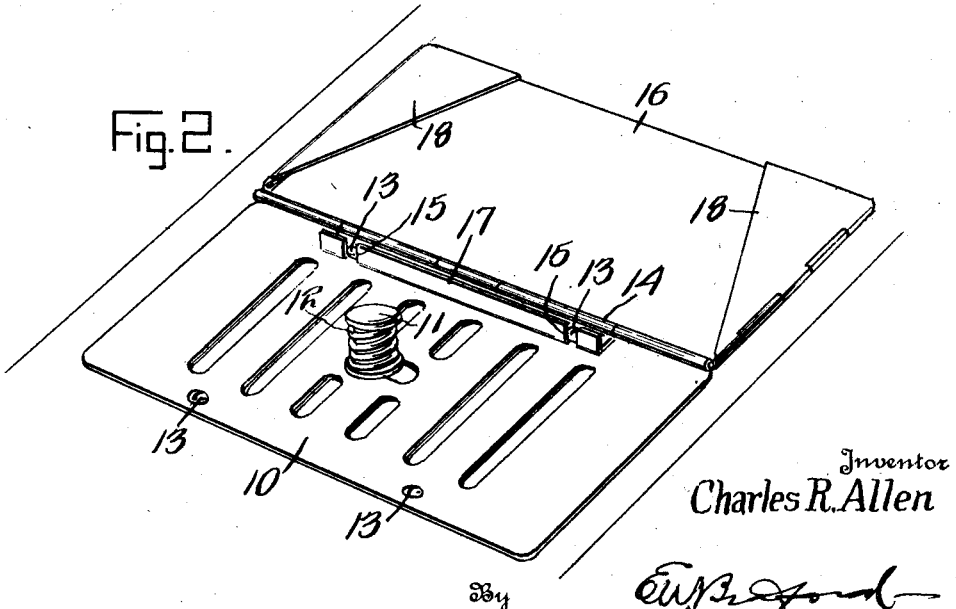
Inventor
Charles R. Allen Patented Apr. 16, 1929.

1,709,650

UNITED STATES PATENT OFFICE.

CHARLES R. ALLEN, OF NORTH VERNON, INDIANA.

HEAT DEFLECTOR.

Application filed January 7, 1928. Serial No. 245,192.

My invention relates to deflectors or distributors for heat issuing from registers of automobile heaters and it is an object of the invention to provide a device of this character by means of which heat may be directed to any part of the automobile desired, all as will be hereinafter more particularly described and claimed.

Referring to the accompanying drawings which are made a part hereof and on which similar reference characters indicate similar parts, Figure 1 is a perspective illustrating one application of my invention, Figure 2, a perspective with the device in inoperative position, and Figure 3, a transverse section with the hinge in a different position from that of Fig. 2.

In the drawings reference character 10 indicates a conventional register associated with any desired type of automobile heater comprising a pair of perforated plates slidable relative to each other and held together by means of a bolt 11 and spring 12. The register is held in place by screws 13, two of which are disposed at each side of the same.

My invention comprises an angle-iron base or support 14, which is L-shaped in cross section, or has two sides disposed at right angles to each other, each of which is adapted to rest flat upon an object and form a support for the device. Each of the two sides of the member 14 is provided with a pair of spaced slots 15 each of which extends across both the sides for the reception of screws 13. At the edge of one of the sides of the base or support 14 is pivoted a plate 16 which is adapted to be folded to a position over the register 10 and held in an angle of substantially 30 degrees The plate 16 is provided at its ends with hinged end members 18 which when the device is in operative position form with the plate 16 a hood with only one side open from which heat may escape. On account of its construction when the device is not in use the plate 16 with its end plates 18 may be folded back flat on the floor of a car in order not to be in the way of the occupants of the car.

By mounting the main plate 16 on an angle iron support provided with slots in each side for the reception of the screws 13, I have provided means which will permit the main plate 16 to lie flat against the floor or other surface on which the register 10 rests, as shown in Figure 2, or will be spaced above the floor far enough to accommodate a carpet as shown in Figure 3. When the screws 13 engage the side of the support to which the plate 16 is hinged, the plate will lie in the plane of the floor, and when turned so that the free side of the support 17 is flat against the register with the screws 13 engaging such side, the plate 16 will be disposed in a plane above the plane of the surface upon which the register rests for allowing the deflector plate to fall back over the carpet 19. This last position is not possible with the parts in the previous position.

When being used for deflecting heat the plate 16 is disposed at an angle of 30 degrees over and in contact with the head of the bolt 11, as shown in Figure 1, and with the end plates 18 in vertical position for causing the heat to discharge at one side only of the register 10, or if desired one or both of the end plates 18 may be folded under the main plate 16 and flat against the same to permit the heat to discharge from one or both ends of the device.

It will be obvious to those skilled in the art that various changes may be made in my device without departing from the spirit of the invention, and I, therefore, do not limit myself to what is shown in the drawings and described in the specification, but only as set forth in the appended claims. As will be readily understood, the deflector and register may be constructed for sale as a single unit, or the deflector may be made separately for attachment to and use with registers already installed.

Having thus fully described my said invention, what I claim as new and desire to secure by Letters Patent, is:

1. A heat deflector for automobile heaters adapted to be pivoted in a manner to fold over the register of the heater, said deflector comprising a body of a size corresponding to the register of the heater, means for pivotally supporting one edge of the plate at the edge of the register, means for supporting the plate in inclined position over the register and adapted to prevent the plate from being folded flat upon the register, and end members pivotally carried by said plate for closing the space between the ends of the inclined plate and the register over which it is supported whereby heat will be directed in a single direction, substantially as set forth.

2. A deflector for heat issuing from the register of an automobile heater comprising a support adapted to be secured at one edge of the register, a heat deflecting plate pivoted to said support and foldable rearwardly into substantially parallel relation with the register out of heat deflecting position, and means for securing the support in a manner to space the plate in a plane offset from the plane of the register, substantially as set forth.

3. A deflector for heat issuing from the register of an automobile heater comprising a support adapted to be secured at one edge of the register, said support having two sides disposed at right angles, a heat deflecting plate hinged to the outer edge of one side of said support, and means for securing the side of the support remote from the hinge to the plate whereby the plate is disposed in offset relation from the register, substantially as set forth.

4. A device of the class described comprising a strip of angle iron, a heat deflecting plate hinged to one edge of said angle iron, and means for securing either side of said angle iron on a flat surface whereby the heat deflecting plate may be disposed in the plane of the flat surface or in offset relation thereto, substantially as set forth.

In witness whereof, I have hereunto set my hand at North Vernon, Indiana, this 31st day of December, A. D. nineteen hundred and twenty-seven.

CHARLES R. ALLEN.